United States Patent
Fujii

(10) Patent No.: US 9,723,176 B2
(45) Date of Patent: Aug. 1, 2017

(54) IMAGE PROCESSING APPARATUS, METHOD AND NON-TRANSITORY COMPUTER READABLE MEDIUM FOR TRANSFERRING A DUPLICATE OF A DOCUMENT TO ANOTHER IMAGE PROCESSING APPARATUS WITHIN AN IMAGE PROCESSING APPARATUS GROUP

(71) Applicant: FUJI XEROX CO., LTD., Tokyo (JP)

(72) Inventor: Masaru Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/057,619

(22) Filed: Mar. 1, 2016

(65) Prior Publication Data
US 2017/0094118 A1    Mar. 30, 2017

(30) Foreign Application Priority Data
Sep. 24, 2015   (JP) ................. 2015-186443

(51) Int. Cl.
*H04N 1/44*    (2006.01)
*H04N 1/00*    (2006.01)
*G06F 3/12*    (2006.01)

(52) U.S. Cl.
CPC ......... *H04N 1/4413* (2013.01); *G06F 3/1222* (2013.01); *G06F 3/1238* (2013.01); *G06F 3/1268* (2013.01); *G06F 3/1273* (2013.01); *G06F 3/1291* (2013.01); *H04N 1/00347* (2013.01); *H04N 1/444* (2013.01);
(Continued)

(58) Field of Classification Search
None
See application file for complete search history.

(56) References Cited

U.S. PATENT DOCUMENTS 7,027,169 B1 *   4/2006   Morikawa ............. G06F 3/1213
                                                                 358/1.13
8,885,194 B2    11/2014   Maezawa et al.
(Continued)

FOREIGN PATENT DOCUMENTS

JP   2009-075832 A   4/2009
JP   2013-092890 A   5/2013

*Primary Examiner* — Benny Q Tieu
*Assistant Examiner* — Haris Sabah
(74) *Attorney, Agent, or Firm* — Oliff PLC

(57) ABSTRACT

An image processing apparatus includes a providing unit, a transfer unit, a reception history record recording unit, a printing history record recording unit, and a deletion unit. The providing unit provides document data accumulated in the image processing apparatus in response to a request from another image processing apparatus within the same group. The transfer unit transfers a duplicate of a document to another image processing apparatus within the same group. Upon receiving a duplicate of a document from another image processing apparatus within the same group, the reception history record recording unit accumulates the duplicate, and records a reception history. In response to printing of a document, the printing history record recording unit records a printing history for the document. Upon obtaining a reception history and a printing history for a document accumulated in the image processing apparatus, the deletion unit deletes the document from the image processing apparatus.

4 Claims, 16 Drawing Sheets

(52) U.S. Cl.
CPC ............... *H04N 2201/0039* (2013.01); *H04N 2201/0094* (2013.01)

(56) References Cited

U.S. PATENT DOCUMENTS

2005/0078338 A1* 4/2005 Kim .................. H04N 1/32122
358/1.16
2010/0036796 A1* 2/2010 Kajikawa .......... G06F 17/30952
706/54

* cited by examiner

FIG. 5

| DOCUMENT ID | DUPLICATE SOURCE | JOB TYPE | ..... |
|---|---|---|---|
| 100001 | DEVICE A | RECEPTION | ..... |
| ..... | ..... | ..... | ..... |
| ..... | ..... | ..... | ..... |

FIG. 7

| DOCUMENT ID | DUPLICATE SOURCE | JOB TYPE | ..... |
|---|---|---|---|
| 100001 | DEVICE A | RECEPTION | ..... |
| 100001 | — | PRINTING | ..... |
| 100002 | DEVICE B | RECEPTION | ..... |
| 100002 | — | PRINTING | ..... |
| ..... | ..... | ..... | ..... |

FIG. 13

| DOCUMENT ID | DUPLICATE SOURCE | JOB TYPE | ..... |
|---|---|---|---|
| 100001 | DEVICE A | RECEPTION | ..... |
| 100002 | DEVICE B | RECEPTION | ..... |
| ..... | ..... | ..... | ..... |

IMAGE PROCESSING APPARATUS, METHOD AND NON-TRANSITORY COMPUTER READABLE MEDIUM FOR TRANSFERRING A DUPLICATE OF A DOCUMENT TO ANOTHER IMAGE PROCESSING APPARATUS WITHIN AN IMAGE PROCESSING APPARATUS GROUP

CROSS-REFERENCE TO RELATED APPLICATIONS

This application is based on and claims priority under 35 USC 119 from Japanese Patent Application No. 2015-186443 filed Sep. 24, 2015.

BACKGROUND (i) Technical Field

The present invention relates to an image processing apparatus, an image processing method, and a non-transitory computer readable medium.

(ii) Related Art

Documents (print data) which are sent from personal computers or other suitable devices of users to image processing apparatuses such as multifunction printers (also referred to as image forming apparatuses) may be printed and output immediately or accumulated in the image processing apparatuses for a certain period of time. As an example of the latter, some forms of use such as confidential printing or security printing are available. In these forms of use, a user sends a document (print data) to an image processing apparatus from his/her own computer to accumulate the document (print data) in the image processing apparatus and then goes to the image processing apparatus to give instructions to output a password and the like. The document is thus accumulated in the image processing apparatus for a period during which the user goes and performs an output operation on the image processing apparatus.

In addition, systems that allow image processing apparatuses such as multifunction printers connected to a network to run as a group have become widespread. In such a system, a document accumulated in an image processing apparatus by a user is also displayed in a list on a user interface (UI) screen of another image processing apparatus in the same group to allow the document to be selected from the displayed list and printed and output. In some of the systems, a duplicate of a document accumulated in an image processing apparatus which is to be shut down is transferred to another image processing apparatus on a network to enable the document to be printed from the other image processing apparatus even during the shutdown.

SUMMARY

According to an aspect of the invention, there is provided an image processing apparatus including a providing unit, a transfer unit, a reception history record recording unit, a printing history record recording unit, and a deletion unit. The providing unit provides document data accumulated in the image processing apparatus in response to a request from another image processing apparatus within an apparatus group that is identical to an apparatus group to which the image processing apparatus is included. The transfer unit transfers a duplicate of a document accumulated in the image processing apparatus to another image processing apparatus in an in-operation state within the apparatus group when the image processing apparatus transitions to an inaccessible state. Upon receiving a duplicate of a document from another image processing apparatus within the apparatus group, the reception history record recording unit accumulates the received duplicate, and records a reception history record indicating receipt of the duplicate. In response to printing of a document in the image processing apparatus or a document obtained from another image processing apparatus within the apparatus group, the printing history record recording unit records a printing history record indicating printing of the document. Upon obtaining a reception history record and a printing history record for a document accumulated in the image processing apparatus from another image processing apparatus within the apparatus group after the image processing apparatus has transitioned from the inaccessible state to the in-operation state, the deletion unit deletes the document from the image processing apparatus.

BRIEF DESCRIPTION OF THE DRAWINGS

An exemplary embodiment of the present invention will be described in detail based on the following figures, wherein:

FIG. 5 illustrates an example of reception history records;

FIG. 7 illustrates an example of log data including reception history records and printing history records;

FIG. 13 illustrates an example of log data in an apparatus (a device C) in an in-operation state in the situation illustrated in FIG. 12;

DETAILED DESCRIPTION

An exemplary embodiment of the present invention will be described hereinafter with reference to the drawings.

Figure 1:
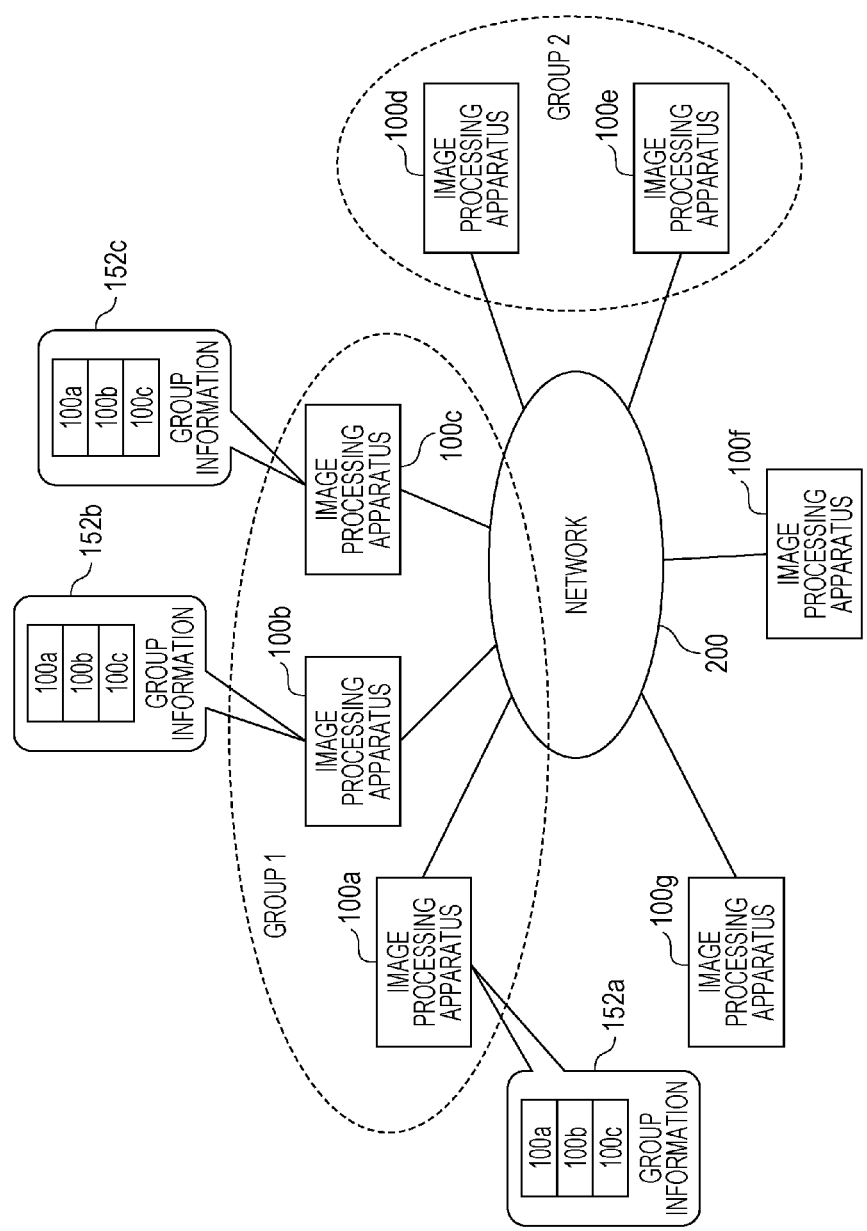
FIG. 1 illustrates a system in which plural image processing apparatuses form a group.

As illustrated in FIG. 1, image processing apparatuses 100a to 100g according to this exemplary embodiment (hereinafter referred to collectively as the image processing apparatuses 100 or individually as an image processing apparatus 100 unless they are distinguished from one another) are configured to communicate with one another via a network 200 for data communication such as a local area network (LAN). Each of the image processing apparatuses 100 is assigned a communication address (e.g., an Internet protocol (IP) address) for use in communication over the network 200.

The image processing apparatuses 100 are devices having a function of receiving and printing print data (hereinafter also referred to as a "document"), and examples of the devices include digital printers and digital multifunction printers (devices having functions of multiple devices such as a printer, a scanner, a copying machine, and a facsimile machine). Each of the image processing apparatuses 100 receives print data from a client device (not illustrated) such as a personal computer or a mobile terminal (e.g., a smartphone) via the network 200.

In FIG. 1, each of the image processing apparatuses 100 is configured to form a group with another image processing apparatus 100, and the image processing apparatuses 100 have a mechanism for enabling a document (print data) input to and accumulated in an image processing apparatus 100 within a group to be also printed and output from any other image processing apparatus 100 within the same group. This mechanism is a serverless (no server required) mechanism which is implementable with a cooperative operation of the plural image processing apparatuses 100. That is, this mechanism does not use any servers such as a print server that manages input documents (print data) in a centralized manner. In the following, the function of enabling a document accumulated in an image processing apparatus 100 within a group to be also printed from any other image processing apparatus 100 within the same group is also referred to as the "group printing function". In addition, a group of image processing apparatuses 100 among which the group printing function is implemented is referred to simply as a "serverless group" or simply as a "group".

The image processing apparatuses 100a to 100g respectively store pieces of group information 152a to 152g each indicating a group to which the corresponding one of the image processing apparatuses 100a to 100g belongs (in FIG. 1, only the pieces of group information 152a to 152c are illustrated). The pieces of group information 152a to 152g (hereinafter collectively referred to as the group information 152 unless each piece of group information is distinguished from the other pieces of group information) each include a list of communication addresses of the image processing apparatuses 100 included in the group to which the corresponding image processing apparatus 100 belongs. In the example illustrated in FIG. 1, the image processing apparatuses 100a, 100b, and 100c form a group ("group 1"), and the image processing apparatuses 100a, 100b, and 100c respectively hold the pieces of group information 152a, 152b, and 152c, each of which includes a list of communication addresses of the image processing apparatuses 100a, 100b, and 100c.

Focus is placed on one of the image processing apparatuses 100. The group information 152 stored in the image processing apparatus 100 indicates the communication address or addresses of a member image processing apparatus or apparatuses 100 with which the image processing apparatus 100 cooperate to implement the group printing function.

In an exemplary specific usage situation, the system illustrated in FIG. 1 is a system constituted by multiple image processing apparatuses 100 located in, for example, a company, and the multiple image processing apparatuses 100 are separated into several groups depending on how to operate within the company, by way of example.

Each of the image processing apparatuses 100 may belong to plural groups. In an example illustrated in FIG. 2, an image processing apparatus a belongs to both a group X and a group Y. The image processing apparatus a is capable of outputting not only a document accumulated in the image processing apparatus a but also both documents accumulated in image processing apparatuses b, c, and d included in the group X and documents accumulated in image processing apparatuses e and f included in the group Y.

Figure 2:
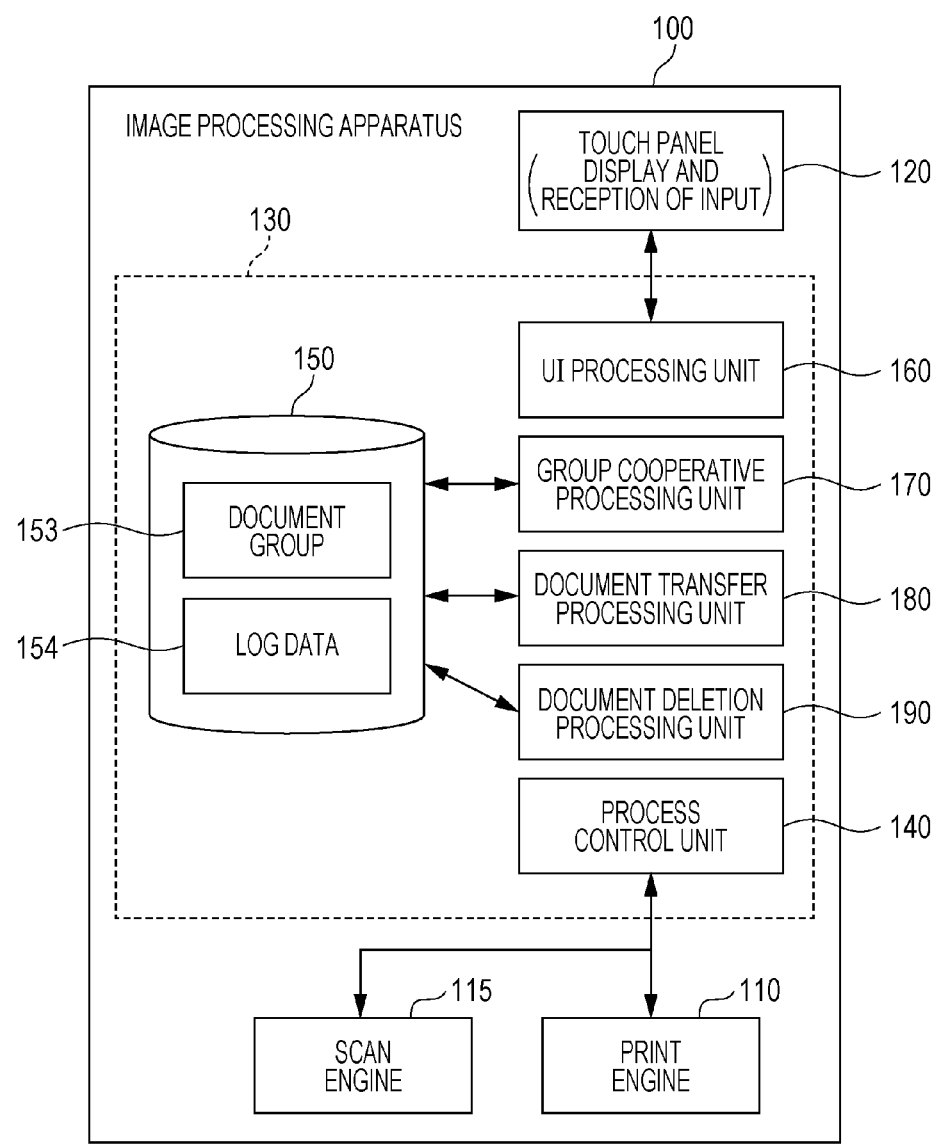
FIG. 2 illustrates an example functional configuration of each individual image processing apparatus.

FIG. 2 illustrates an example internal configuration of each of the image processing apparatuses 100.

In the image processing apparatus 100 illustrated in FIG. 2, a print engine 110 is a component for forming (or printing) an image on a medium such as a sheet of paper. A scan engine 115 is a component for optically reading an image on a medium and generating image data indicating the read image. In FIG. 2, the image processing apparatus 100 has, for example but not limited to, printing, scanning, and copying functions. The image processing apparatus 100 may also have a facsimile transmission and reception function, for example, or may be a single-function apparatus having a printing function or any other function only. The same applies to modifications described below.

A touch panel 120 is a device used for a local user interface (UI) of the image processing apparatus 100, and is configured to display a UI screen or to receive an input from a user touching the UI screen. The image processing apparatus 100 may include, as a device used for a local UI, a display device and an input device having mechanical buttons and a ten-key pad, instead of or in addition to the touch panel 120.

An information processing unit 130 is a component that executes various information processing operations for controlling the image processing apparatus 100. The information processing unit 130 includes a process control unit 140, a storage unit 150, a UI processing unit 160, a group cooperative processing unit 170, a document transfer processing unit 180, and a document deletion processing unit 190.

The process control unit 140 controls the print engine 110 and the scan engine 115 to execute a process specified by a user. For example, the process control unit 140 converts print data received from a personal computer or any other suitable device of the user via the network 200 or the like into image data acceptable by the print engine 110, and supplies the image data to the print engine 110 for printing. Further, the process control unit 140 controls the scan engine 115 to read an image on a document and save image data of the read image in a local storage area or transmit the image data to a personal computer or any other suitable device on a network. Further, the process control unit 140 causes the print engine 110 to print an image read by the scan engine 115 to implement a copying process.

The process control unit 140 also has a function of storing (or accumulating) a document (print data) received from a user via the network 200 or the like in an internal storage device (not illustrated) of the image processing apparatus 100 in association with identification information (referred to as a "user ID") on the user. The user ID of the user who has input the print data may be obtained by the image processing apparatus 100 performing user authentication when the user sends a request to the image processing apparatus 100 to accumulate the print data.

The storage unit 150 stores a document group 153 received from a user, and log data 154 for the process performed by the image processing apparatus 100.

The UI processing unit 160 performs a user interface process of the image processing apparatus 100. For example, the UI processing unit 160 displays UI screens such as a menu screen and a setting screen on the touch panel 120, and obtains user inputs through the UI screens.

The group cooperative processing unit 170 performs a process for implementing the group printing function described above.

For example, the group cooperative processing unit 170 generates a print item selection screen in accordance with instructions given by a user (authenticated) who is operating the local UI (such as the touch panel 120) of the image processing apparatus 100. Alternatively, the group cooperative processing unit 170 collects a list of documents registered by the user from the image processing apparatus 100 or from another image processing apparatus 100 on the network 200 with which the image processing apparatus 100 cooperates (i.e., another image processing apparatus 100 within the same group), and combines the collected list of documents to generate a print item selection screen. When collecting the list of documents, the group cooperative processing unit 170 transmits a document list request to the communication addresses of the other image processing apparatuses 100 included in the group information 152 as destination image processing apparatuses 100. The document list request includes the user ID of the requesting user as a parameter. The group cooperative processing unit 170 obtains a document list returned from the destination image processing apparatuses 100 in response to the document list request. The UI processing unit 160 generates a print item selection screen including the document list, and displays the print item selection screen on the touch panel 120. The user selects on the print item selection screen a document that the user currently wishes to print. The result of the selection is transmitted to the group cooperative processing unit 170 via the UI processing unit 160. The group cooperative processing unit 170 sends a request for the selected document to the image processing apparatus 100 in which the document is accumulated, and passes the document obtained accordingly to the process control unit 140 to provide a printing instruction.

Further, upon receipt of a document list request including a user ID from another image processing apparatus 100, the group cooperative processing unit 170 generates a list of documents corresponding to the user ID, which are accumulated in the image processing apparatus 100 including the group cooperative processing unit 170 (hereinafter referred to also as the "subject image processing apparatus 100"), and returns the generated list to the requesting image processing apparatus 100. Further, upon receipt of a request for a document in the list from another image processing apparatus 100 to which the list has been provided, the group cooperative processing unit 170 transmits the document to the other image processing apparatus 100.

Upon receipt of an instruction for bringing the image processing apparatus 100 into a state in which the image processing apparatus 100 is not accessible from the other image processing apparatuses 100 for a long period of time greater than or equal to a threshold value (hereinafter referred to as an "inaccessible state"), such as shutting down the image processing apparatus 100, the document transfer processing unit 180 performs a process of duplicating a document group accumulated in the internal storage device of the image processing apparatus 100 and transferring (or moving) the resulting duplicate document group to another image processing apparatus 100 within the same group. When an image processing apparatus 100 is in an inaccessible state, none of the documents accumulated in the image processing apparatus 100 can be output from another image processing apparatus 100 with which the image processing apparatus 100 cooperates. In order to avoid such a situation as much as possible, in this exemplary embodiment, a duplicate of a document group accumulated in an image processing apparatus 100 which enters an inaccessible state is accumulated in another image processing apparatus 100.

The document deletion processing unit 190 performs a process for deleting from the storage unit 150 a document which has been printed and output. The deletion of a document from the storage unit 150, which is performed by the document deletion processing unit 190, includes the deletion of a document printed by the subject image processing apparatus 100 ("subject device"), and the deletion of a document corresponding to a document printed by any other image processing apparatus 100 (referred to as a "cooperative device") within the same group (i.e., the deletion of a duplicate or original of the document printed by the cooperative device). The case of the deletion of a document corresponding to a document printed by a cooperative device further includes a case where the document is printed while the subject device is in a normal in-operation state, and a case where the document is printed while the subject device is in an inaccessible state. The process of the document deletion processing unit 190 will be described in detail below.

The foregoing description has been made of the configuration of the image processing apparatus 100. Next, an example of a processing procedure performed by the image processing apparatus 100 will be described.

Figure 3:
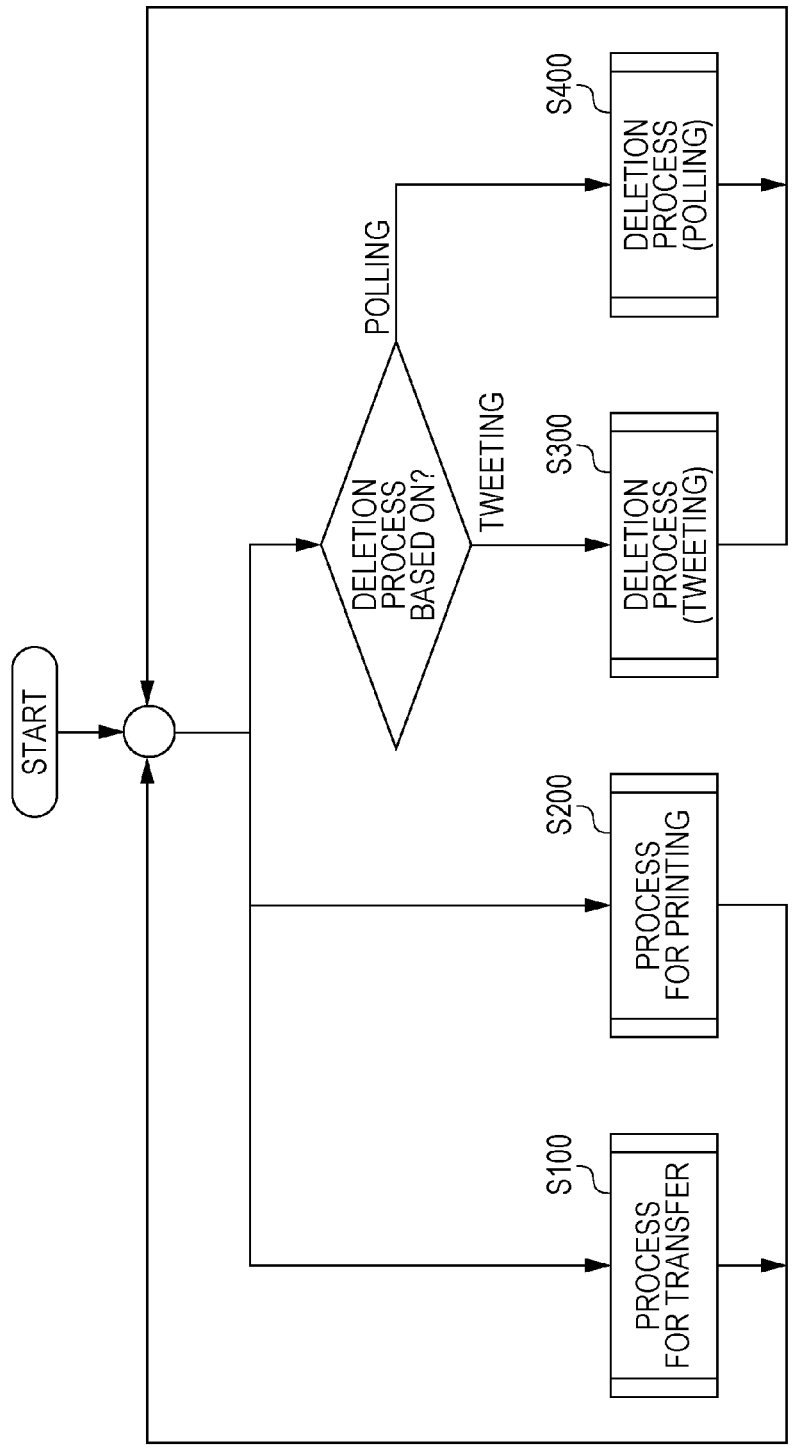
FIG. 3 illustrates an overall processing procedure of the image processing apparatus.

FIG. 3 illustrates an overall flow of a process related to the deletion of a document according to this exemplary embodiment among the processes performed by the image processing apparatus 100.

The illustrated procedure includes four general processes, that is, a process for transfer (S100), a process for printing (S200), and deletion processes (S300 and S400). The details of the processes of S100 to S400 will be described with reference to different drawings.

Each of the processes described above is executed when an event that triggers the corresponding process occurs. The deletion processes of S300 and S400 are processes for deleting, when a document corresponding to a document stored in the storage unit 150 is deleted by a cooperative device while the subject image processing apparatus 100 is in an inaccessible state, the document from the storage unit 150 after the subject image processing apparatus 100 has entered the in-operation state. The processes of S300 and S400 are executed in response to different events as triggers for execution. The process of S300 is a process executed, when the subject image processing apparatus 100 in the inaccessible state enters the in-operation state (for example, when the subject image processing apparatus 100 whose power has been turned off is activated upon being powered on) or when the group cooperative processing unit 170 starts providing a service cooperative with a cooperative device within the group, by using the change of the state or the start of the cooperative service as a trigger, and is referred to as the "process based on tweeting". The process of S400 is a process executed by using, as a trigger, the arrival of a predetermined time interval at the subject image processing apparatus 100 in the in-operation state or under a group cooperative service, and is referred to as the "process based on polling". In the illustrated example, the image processing apparatus 100 executes a preset one of the processes of S300 and S400. However, this is merely an example, and a single image processing apparatus may perform both the processes of S300 and S400. For example, an image processing apparatus may perform the process of S300 when activated, and then perform the process of S400 at periodic intervals.

Figure 4:
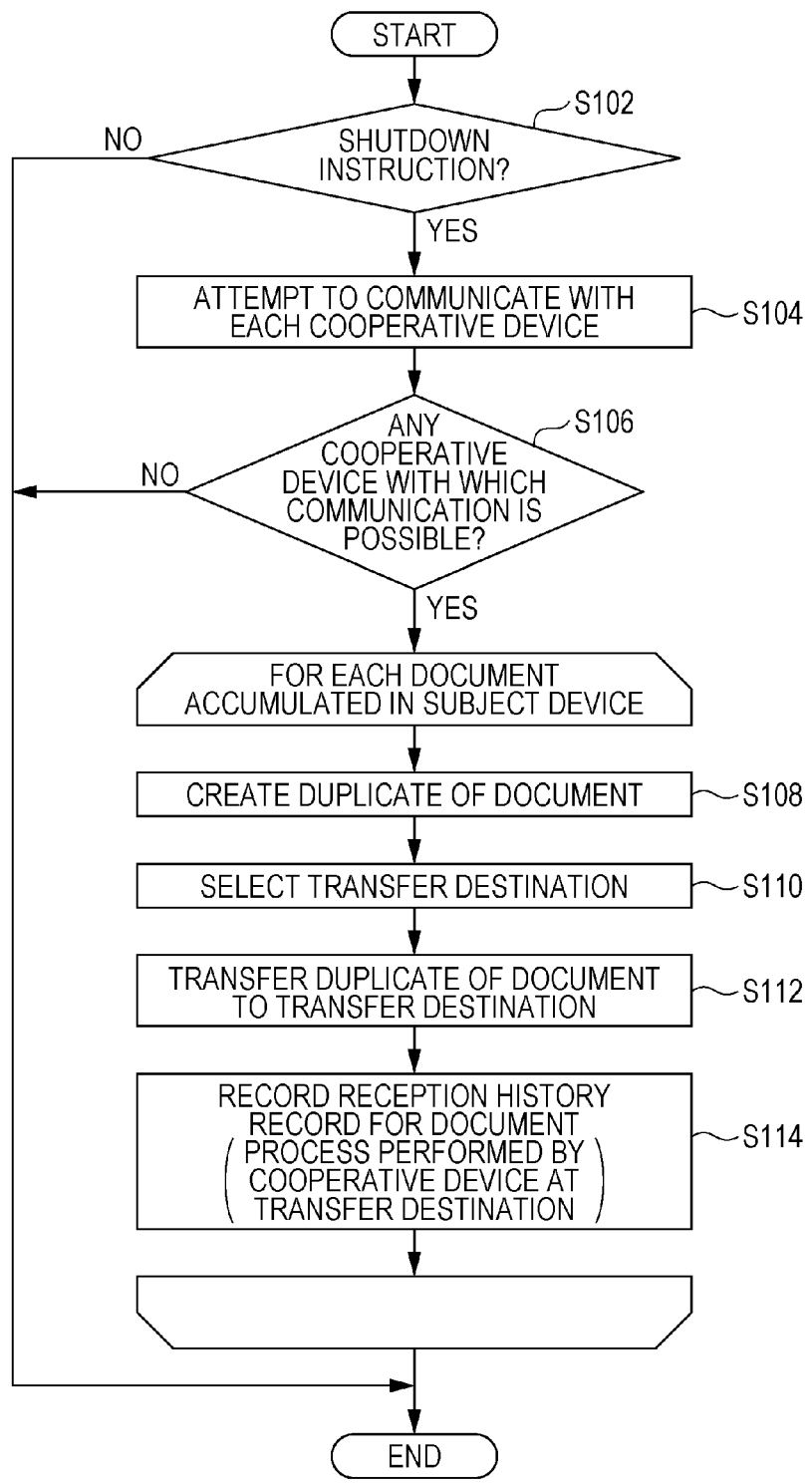
FIG. 4 illustrates an example of a detailed procedure of a process for transfer.

Next, a detailed example of the process for transfer S100 will be described with reference to FIG. 4. The process for transfer is executed by the document transfer processing unit 180 in response to, as a trigger, instructions given to the subject image processing apparatus 100 to transition from the in-operation state to the inaccessible state (in FIG. 4, "shut down" is used as a typical example).

In this process, when a shutdown instruction is given from a user or a high-level device (YES in S102), the document transfer processing unit 180 executes the process after S104. That is, first, the document transfer processing unit 180 attempts to communicate with each cooperative device (i.e., each of the other image processing apparatuses 100 in the same group) (S104). Then, as a result of the attempt, it is determined whether there is a cooperative device with which communication is possible (S106). If there is no cooperative device with which communication is possible, the process ends. If there is a cooperative device with which communication is possible, the process proceeds to the process subsequent to S108.

The processes of S108 to S114 are performed for each document in the document group 153 accumulated in the storage unit 150. That is, the document transfer processing unit 180 first retrieves one document from the storage unit 150, and creates a duplicate of the retrieved document (S108). The created duplicate has the same content and attributes as those of the original document. The attributes include a document ID that is identification information on the document, and the apparatus ID of the image processing apparatus 100 that has received instructions from a user to accumulate the document. The apparatus ID indicates the image processing apparatus 100 in which the original of the document is accumulated. Upon receipt of instructions from a user to accumulate a document, the image processing apparatus 100 accumulates the document in the storage unit 150 and assigns a document ID to the document. The document ID is unique at least in a serverless group. The image processing apparatus 100 then adds the document ID and the apparatus ID of the image processing apparatus 100 to the attributes of the document.

In the illustrated example, in S108, not all the documents accumulated in the storage unit 150 but only an original document received by the image processing apparatus 100 from the user is duplicated. That is, a duplicate received by the image processing apparatus 100 from a cooperative device among the documents stored in the storage unit 150 is not duplicated in S108. Whether each of the documents stored in the storage unit 150 is an original or a duplicate may be determined based on whether or not the log data 154 contains the reception history record of the document. If there is a reception history record including the document ID of the document, the document is a duplicate, or is an original otherwise.

After S108, the document transfer processing unit 180 selects, for each duplicate, a cooperative device at the transfer destination to which the duplicate is to be transferred from among cooperative devices with which communication is possible (S110). Here, the document transfer processing unit 180 selects not only a transfer destination to which the duplicate created in S108 is to be transferred but also a transfer destination to which a duplicate previously received from a cooperative device and accumulated in the storage unit 150 is to be transferred. Which cooperative device is a transfer destination is not related with a characteristic process of this exemplary embodiment. Any known selection standard may be used for selection.

Then, the document transfer processing unit 180 transfers each duplicate to the cooperative device selected as the corresponding transfer destination (S112). The transferred duplicate is deleted from the storage unit 150. The data of the duplicate to be transferred includes, in addition to the data (the content and attributes) of the duplicate, a code indicating the transfer of a duplicate of a document. The duplicates transferred in S112 include both a duplicate that has been accumulated in the storage unit 150 at the time when the process illustrated in FIG. 4 starts and the duplicate created in S108. As a result of the process of S112, only an original document accepted by the subject device is left in the storage unit 150, whereas no duplicates received from cooperative devices are left in the storage unit 150. In the example illustrated in FIG. 4, accordingly, an original document accepted by the subject device is copied to a cooperative device (and thus the original is left in the subject device), whereas a duplicate document previously received from a cooperative device and accumulated in the subject device is moved to a cooperative device.

Upon receipt of the data of the duplicate from the document transfer processing unit 180, the cooperative device at the transfer destination accumulates the duplicate in the storage unit 150 of the cooperative device, and adds to the log data 154 a reception history record indicating receipt of a duplicate transferred from another image processing apparatus 100 (S114).

An example of the reception history record is information in the first row (the row for document ID "100001") of log data illustrated by way of example in FIG. 5. The log data 154 has records (the rows illustrated in FIG. 5) each including a document ID, a duplicate source, a job type, and other items, and the reception history record is a record whose job type is "reception". The job type is an item indicating the type of a process associated with the corresponding log record, and examples of the job type include "printing" in addition to "reception". The job type "reception" is a type of job of receiving a duplicate of a document which has been transferred from a cooperative device. Among the items of the log data 154, the "duplicate source" indicates the apparatus ID of the image processing apparatus 100 that holds the original from which the duplicate has been created. The information on the "duplicate source" may be extracted from the attribute information on the transferred duplicate. The document ID is identification information on the duplicate document, and is identical to the document ID of the original of the document, as described above. The other items of the log data 154 include, for example, the date and time when the corresponding job was executed, and the user ID of a user who sent instructions to execute the corresponding job.

Figure 6:
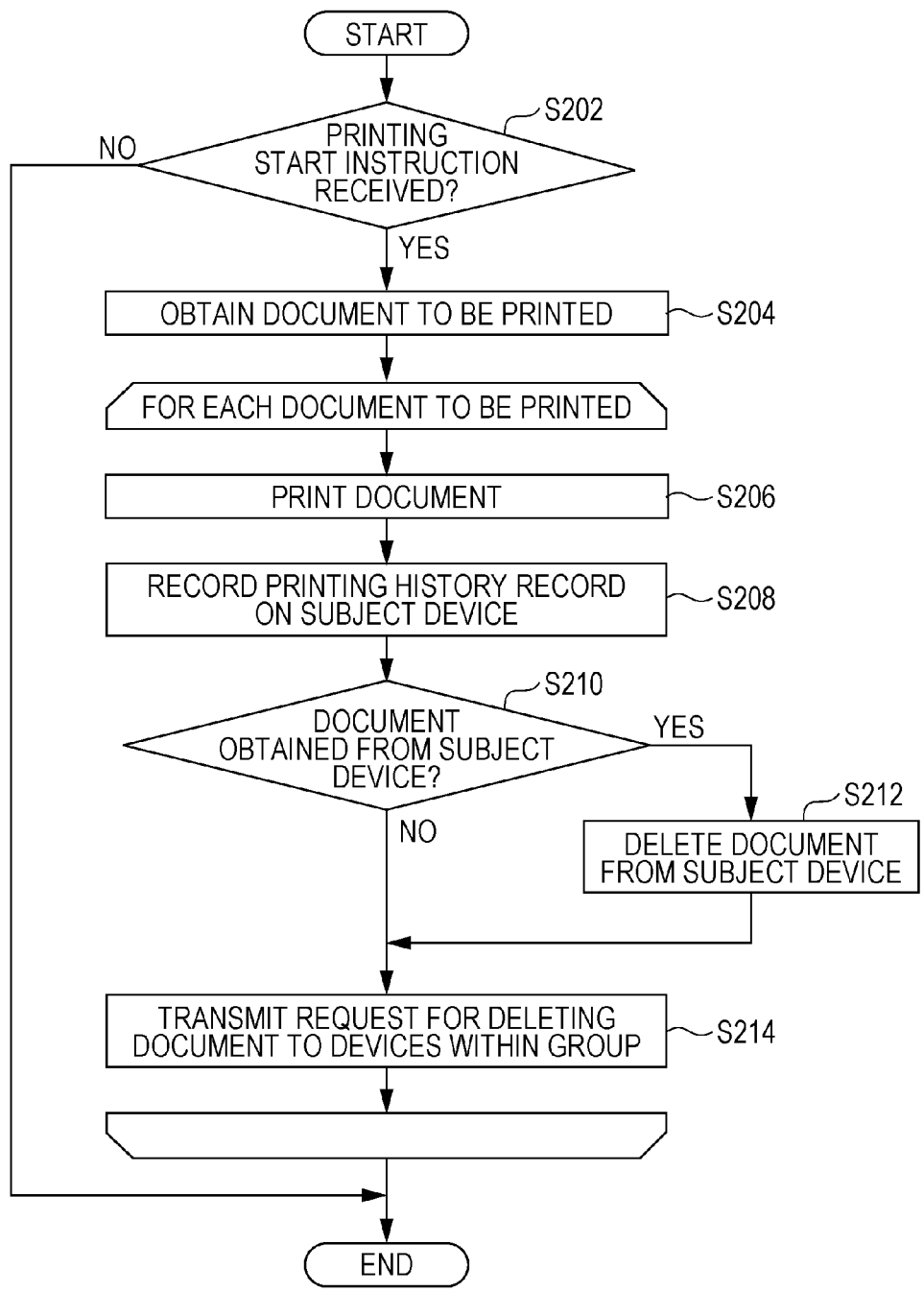
FIG. 6 illustrates an example of a detailed procedure of a process for printing.

Next, a detailed procedure of the process for printing (S200) is illustrated by way of example with reference to FIG. 6. This process is started by a user selecting one or more documents to be printed from among a list of documents that the user has the right to access, which are displayed on the touch panel 120 of the image processing apparatus 100, and giving instructions to start printing.

Specifically, upon receipt of instructions to start printing (YES in S202), the group cooperative processing unit 170 obtains a document to be printed, which is selected by the user, from a cooperative device or the subject device in which the document is accumulated (S204). Then, the process after S206 is executed for each obtained document to be printed.

The group cooperative processing unit 170 passes the obtained document to the process control unit 140 to perform a printing operation (S206). The process control unit 140 causes the print engine 110 to print the document, and records, in the log data 154, a printing history record that is a record for the printing operation (S208).

The printing history record is a log record whose job type is "printing", such as the record for document ID "100001" in the second row from the top of example log data illustrated in FIG. 7 or the record for document ID "100002" in the fourth row from the top of the example log data. In the printing history record, the "document ID" is identification information on a printed document.

After S208, the document deletion processing unit 190 performs the process after S210. Specifically, first, the document deletion processing unit 190 determines whether the document printed in S206 is a document obtained from the storage unit 150 of the subject device or not (i.e., a document obtained from a cooperative device) (S210). If the determination result is YES, the document deletion processing unit 190 deletes the document from the storage unit 150 of the subject device (S212). Further, the document deletion processing unit 190 sends a deletion request including the document ID of the document as a parameter to each cooperative device regardless of whether YES or NO is obtained in S210 (S214). Upon receipt of the deletion request, each cooperative device deletes from the storage unit 150 thereof the document having the document ID included in the deletion request if such a document is stored in the storage unit 150. Since a cooperative device that is in an inaccessible state when the deletion request is transmitted is not able to receive the deletion request, the document (either the original or a duplicate) having the document ID which is stored in the cooperative device is not deleted and is left in the cooperative device. The document that is left without being deleted during the printing operation is deleted in S300 or S400 (deletion process) described below.

Figure 8:
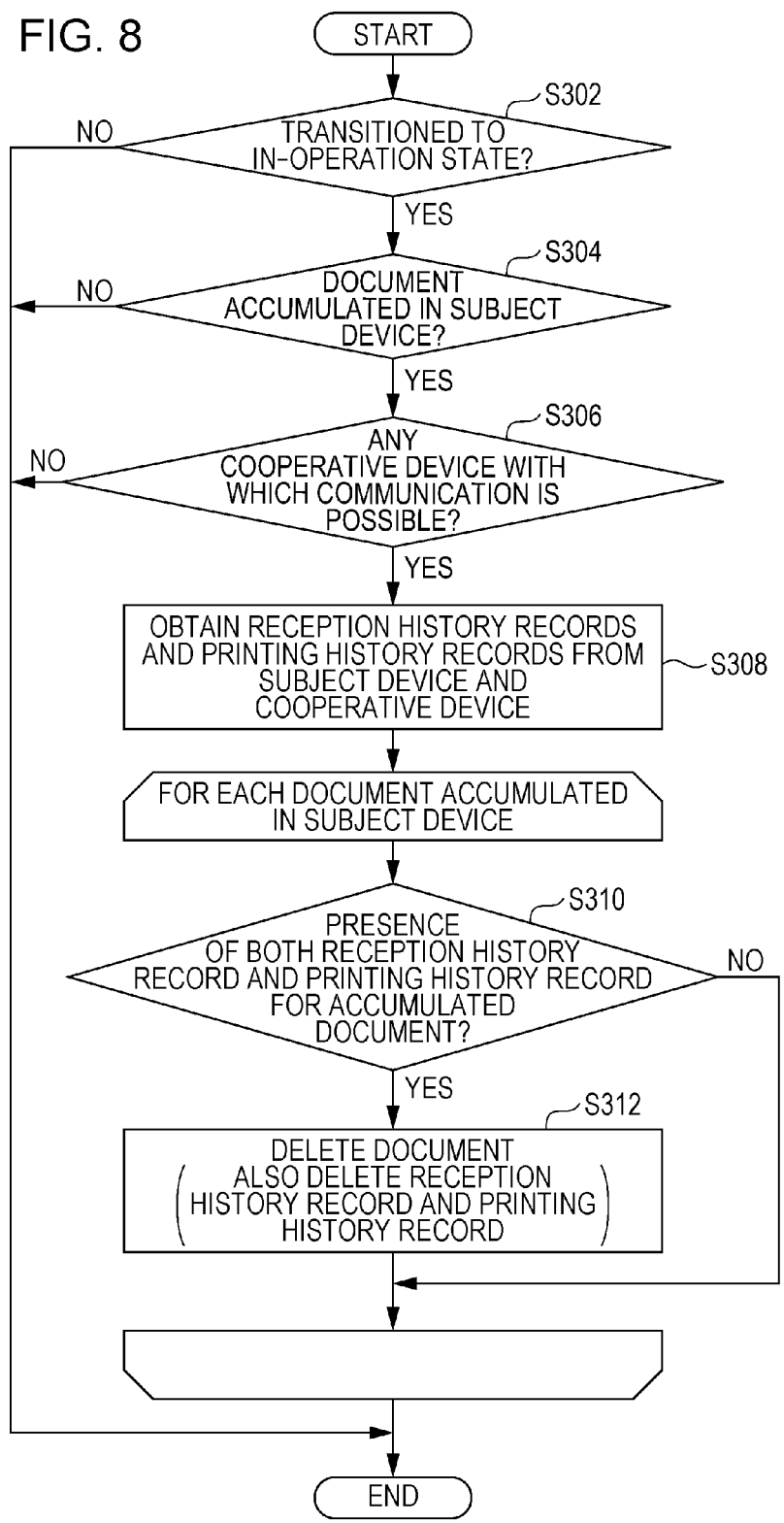
FIG. 8 illustrates an example of a detailed procedure of a deletion process.

Next, a detailed procedure of the deletion process based on tweeting (S300) is illustrated by way of example with reference to FIG. 8. This process is started in response to, as a trigger, the image processing apparatus 100 in the inaccessible state having entered the in-operation state.

Specifically, when the image processing apparatus 100 transitions to the in-operation state upon being, for example, powered on (YES in S302), the document deletion processing unit 190 checks whether or not any documents have been accumulated in the storage unit 150 of the image processing apparatus 100 ("subject device") (S304). If there is no document accumulated in the storage unit 150, there is no "remaining document which has been printed". Thus, the process ends.

If there is any document accumulated in the storage unit 150 of the subject device, then, the document deletion processing unit 190 checks whether or not there is any cooperative device with which communication is possible, by, for example, attempting to communicate with each of the cooperative devices within the same group (S306). If there is no cooperative device with which communication is possible (NO in S306), there is no way to check whether the document in the subject device has been printed by a cooperative device. Thus, the process ends.

If it is determined in S306 that there is any cooperative device with which communication is possible, the document deletion processing unit 190 obtains reception history records and printing history records included in the log data 154 from the subject device and the cooperative device or devices with which communication is possible (S308).

After S308, the document deletion processing unit 190 performs the processes of S310 and S312 for each document accumulated in the storage unit 150 of the subject device. Specifically, the document deletion processing unit 190 searches the reception history records and printing history records obtained in S308 for a reception history record and a printing history record including the document ID of the document. Then, the document deletion processing unit 190 determines whether or not there is any reception history record and printing history record including the document ID (S310). As a result of the determination, if there is found a pair of reception history record and printing history record including the document ID (YES in S310), the document deletion processing unit 190 deletes the document from the storage unit 150 (S312). At this time, the reception history record and printing history record for the document may also be deleted from the subject device or the cooperative device or devices.

If no pair of reception history record and printing history record including the document ID is found in S310, the process of S312 is skipped and the process of S310 is performed for another document accumulated in the subject device.

The deletion process based on tweeting has been described with reference to FIG. 8.

The deletion process based on polling is performed in a manner similar to that of the deletion process based on tweeting but is performed at timing different from that of the deletion process based on tweeting. In the process based on polling, the processes of S304 to S312 illustrated in FIG. 8 are performed at periodic processing time intervals.

The foregoing description has been made of the configuration and processes of the image processing apparatus 100 according to this exemplary embodiment. Next, the overall operation of the system according to this exemplary embodiment will be described using a specific example.

Figure 9:
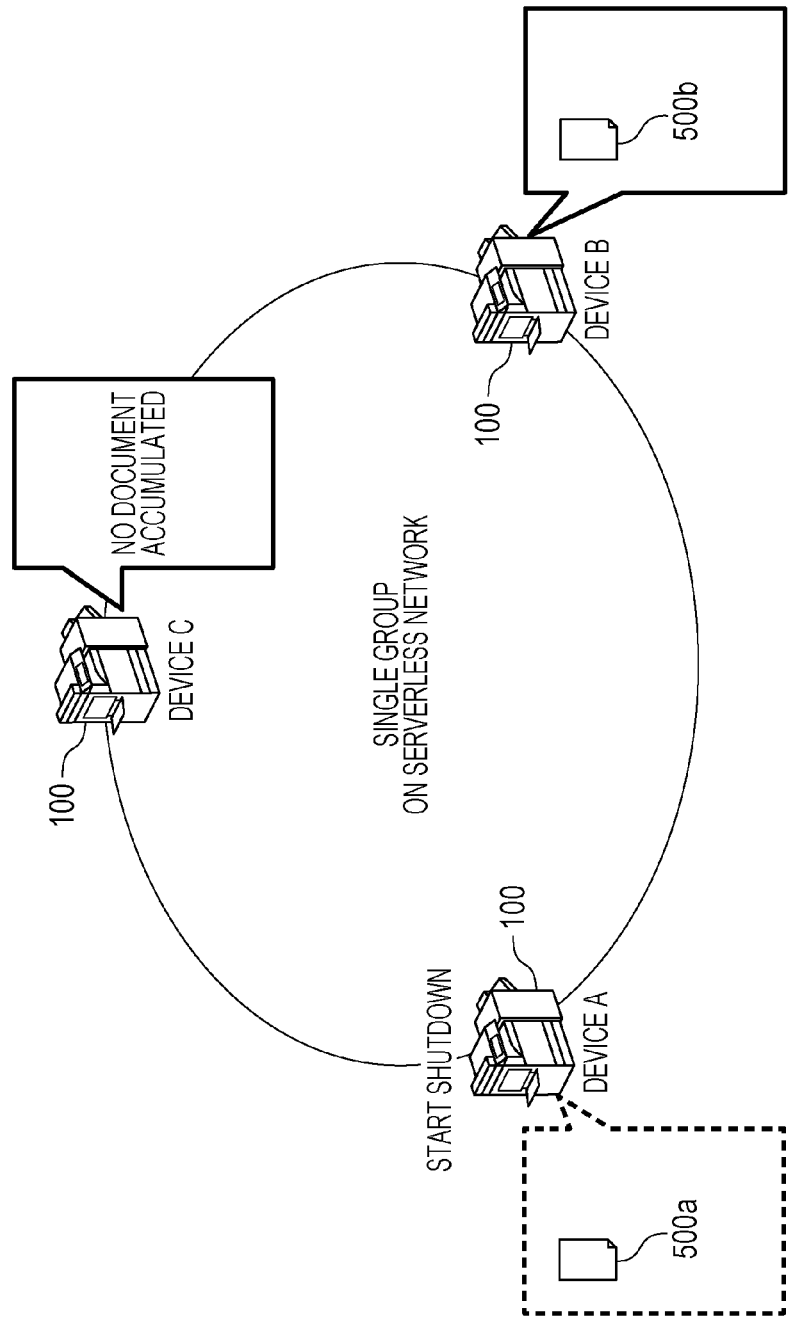
FIG. 9 illustrates a specific example of a group used for describing a process flow.

In the following, as illustrated in FIG. 9, a specific example will be described in the context of a serverless group constituted by three image processing apparatuses 100, that is, A, B, and C (hereinafter referred to as the devices A, B, and C, respectively). In the example illustrated in FIG. 9, a user X accumulates documents 500a and 500b in the devices A and B, respectively. The document 500a has document ID "100001", and the document 500b has document ID "100002". In addition, the user X accumulates no document in the device C. Furthermore, all of the devices A, B, and C are in an in-operation state at this time.

Figure 10:
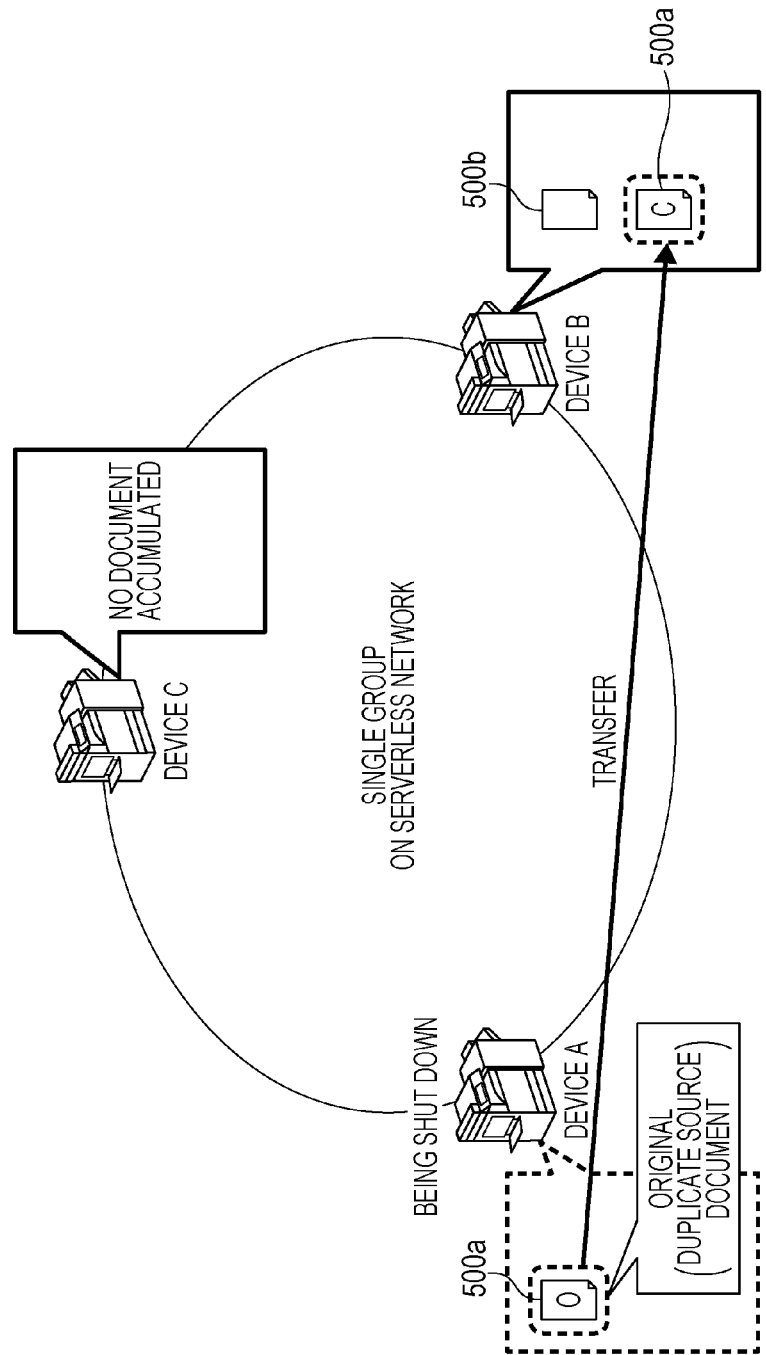
FIG. 10 illustrates a process in the specific example of the group in which one apparatus is shut down.

In this situation, as illustrated in FIG. 10, the device A is instructed to be shut down. In this case, the device A creates a duplicate of the accumulated document 500a, and transfers the duplicate to a cooperative device. It is assumed here that the device B has been selected as the cooperative device at the transfer destination. As a result of this transfer operation, the device B holds the original of the document 500b and the duplicate of the document 500a as documents associated with the user X. In addition, the reception history record in the first row (document ID "100001") of the log data illustrated in FIG. 5 is recorded on the device B. The original of the document 500a is left in the device A which has been shut down. In the drawings, "O" designates the original of a document and "C" designates a duplicate (copy) of the document.

Figure 11:
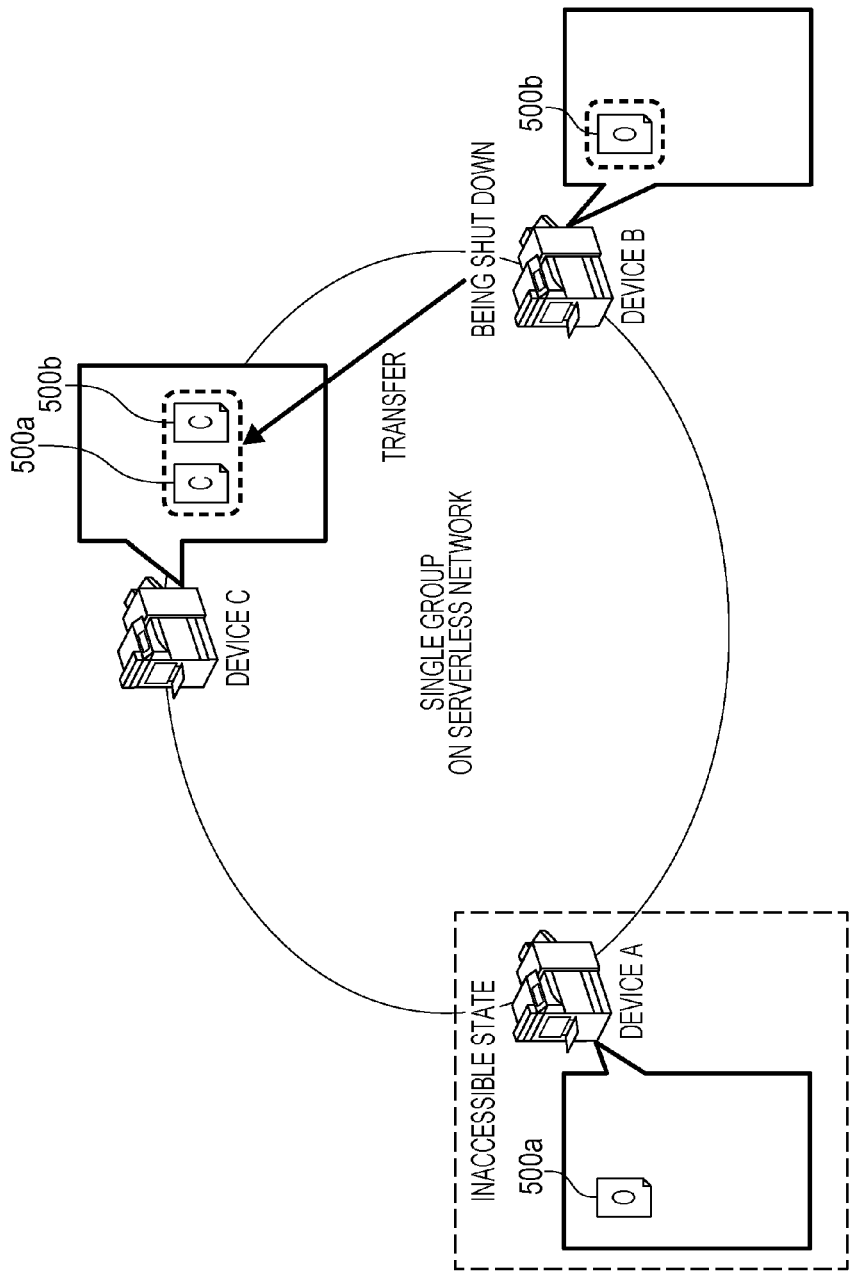
FIG. 11 illustrates a process in the specific example of the group in which another apparatus is further shut down.

Then, as illustrated in FIG. 11, the device B is being shut down. In this case, the device B creates a duplicate of the original document (with document ID "100002") accepted by the device B, and transfers the created duplicate and the duplicate (of the document with document ID "100001") transferred from the device A to the device C, before being shut down.

Figure 12:
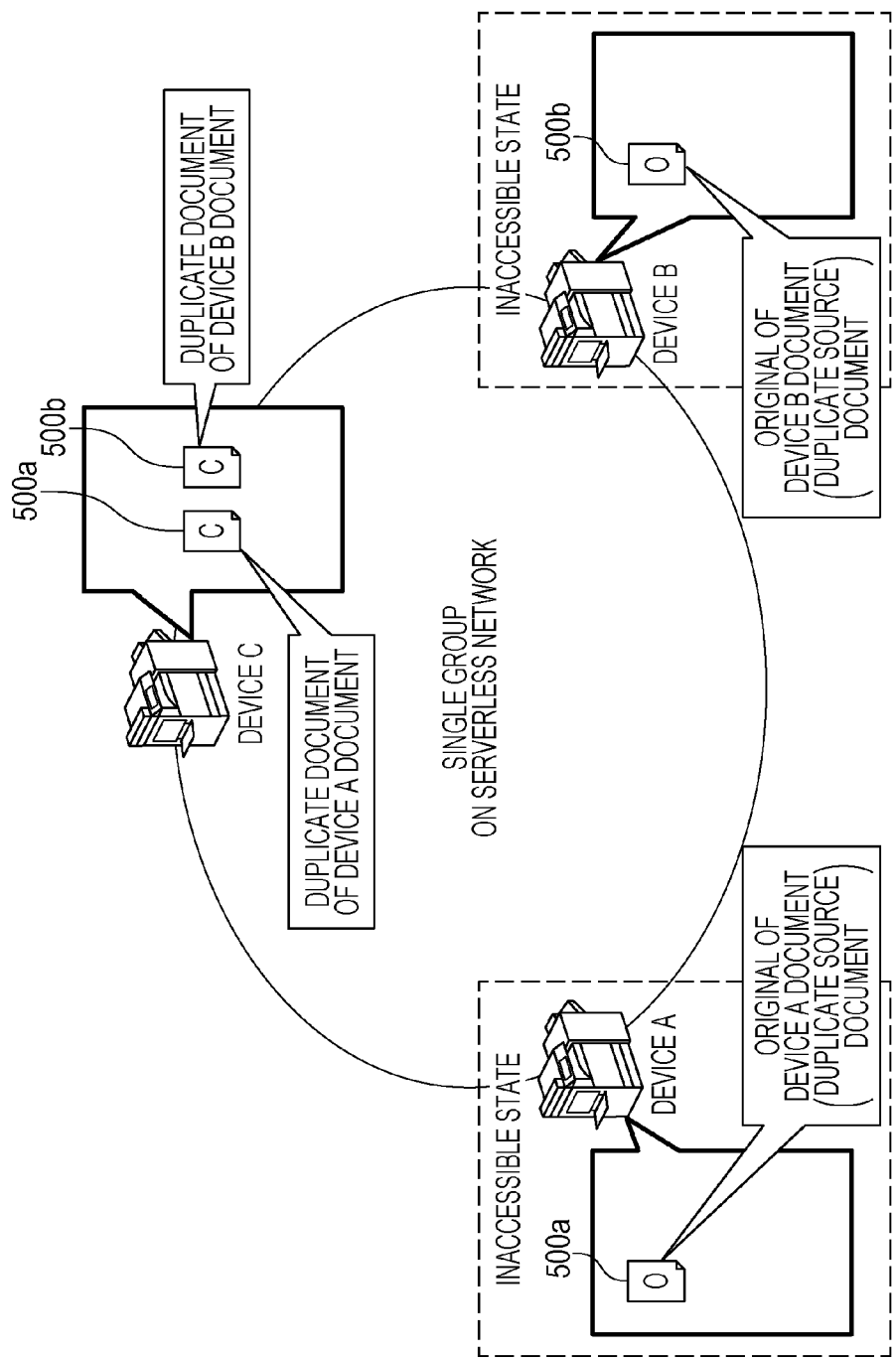
FIG. 12 illustrates documents accumulated in the specific example of the group in which two apparatuses are in an inaccessible state.

As a result, as illustrated in FIG. 12, the original document (with document ID "100002") is left in the device B which has been shut down, and the device C in operation has accumulated therein the two duplicates, namely, the duplicates of the documents with document IDs "100001" and "100002". Further, the device A, which has already been shut down and is in an inaccessible state, has still accumulated therein the original of the document with document ID "100001". In this case, the reception history records in the first and second rows illustrated in FIG. 13 are added to the log data 154 in the device C. These reception history records indicate receipt of the two duplicates. Note that the "duplicate source" of the reception history record for the document with document ID "100001" is the device A in which the original of the document is stored, rather than the device B to which the duplicate document has been transferred.

Figure 14:
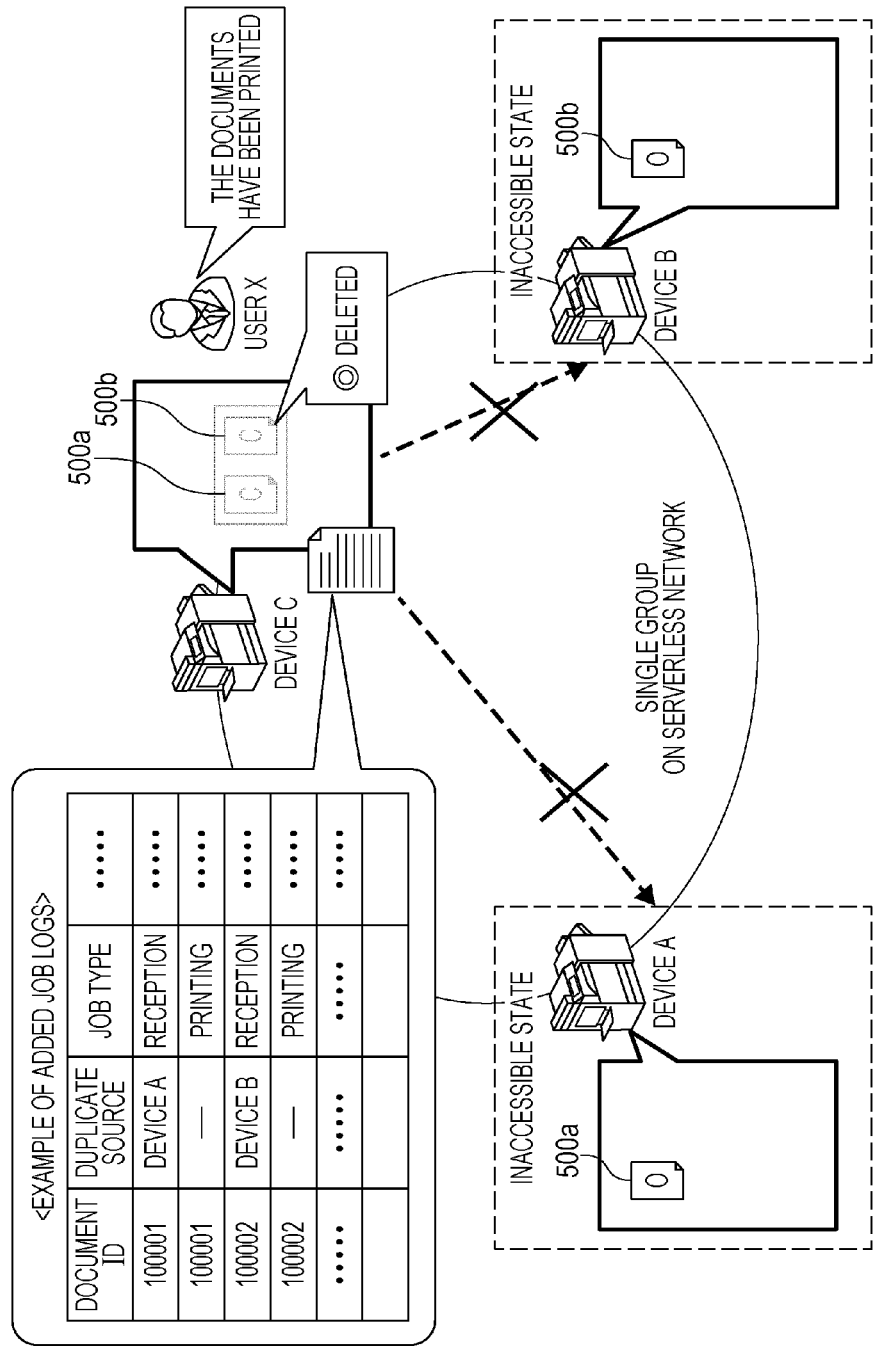
FIG. 14 illustrates a process in the specific example of the group in which a document has been printed on the apparatus in the in-operation state.

In this state, as illustrated in FIG. 14, the user X goes to the device C in operation and prints the two documents (duplicates) accumulated in the device C. Then, printing history records for the two documents with document IDs "100001" and "100002" (the second and fourth rows of the log data illustrated in FIG. 7) are added to the log data 154 in the device C. In addition, the two documents accumulated in the device C are deleted. After the completion of the printing operation, the device C instructs the device A and the device B, which are the respective "duplicate sources" of the two documents, to delete the respective documents. However, both the device A and the device B are in an inaccessible state and thus are not able to receive the request. Therefore, the documents are not deleted.

Figure 15:
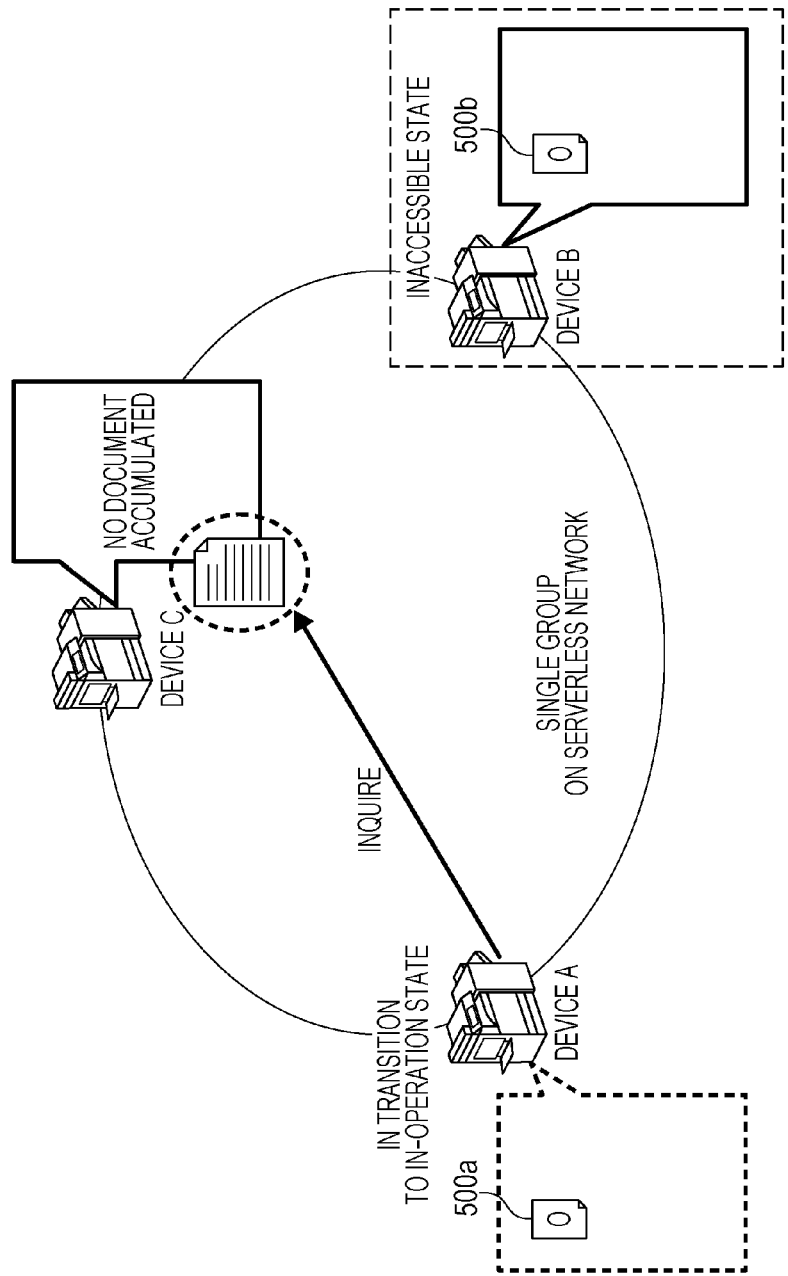
FIG. 15 illustrates a process in the specific example of the group in which one of the apparatuses in the inaccessible state transitions to the in-operation state.
Figure 16:
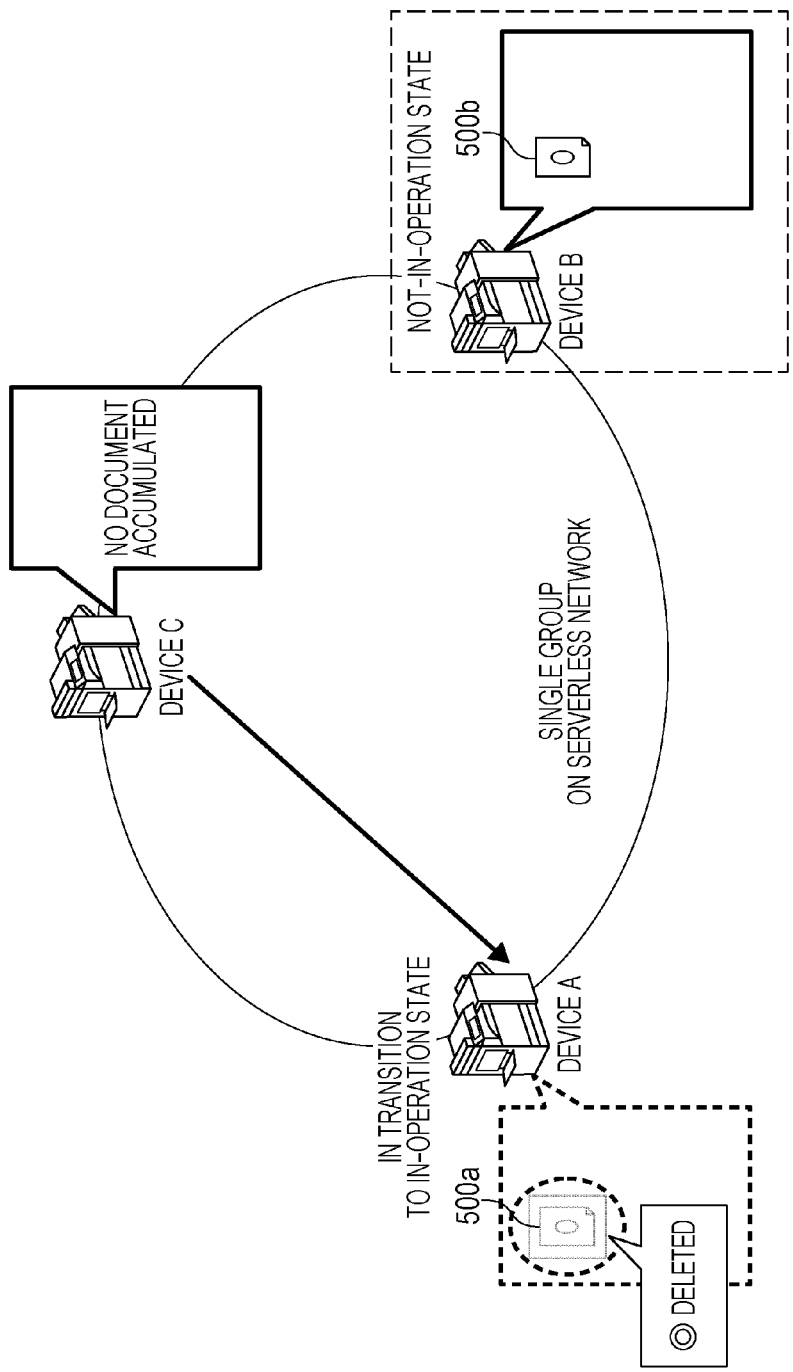
FIG. 16 illustrates a situation in the specific example of the group in which a document has been deleted through a deletion process performed in response to the transition of the apparatus in the inaccessible state to the in-operation state.

Thereafter, the device A is instructed to be activated. In this case, as illustrated in FIG. 15, the device A inquires of a cooperative device within the group about the history of reception and printing (S308 in FIG. 8). In this case, the device C, which is a cooperative device in operation, returns the printing history records and reception history records for the documents with document IDs "100001" and "100002" to the device A. The document with document ID "100001" corresponds to the document accumulated in the device A (see S310 in FIG. 8). Thus, as illustrated in FIG. 16, the device A deletes the corresponding document from the storage unit 150 (see S312 in FIG. 8). Accordingly, the document data of the document with document ID "100001", which has been printed, is completely deleted from the group.

Similar processing is performed on the device B which is activated, and the document data of the document with document ID "100002", which is left in the device B, is deleted.

After the state illustrated in FIG. 14, the device C might be in an inaccessible state when the device A or the device B is activated. In this case, none of the device A and the device B is able to obtain a reception history record and a printing history record from the device C when activated. In this case, the device A and the device B execute a deletion process based on polling so as to be notified by the device C at the timing of polling subsequent to the time when the device C is activated that the documents left in the storage units 150 of the device A and the device B have been printed, thus enabling the respective documents to be deleted from the device A and the device B.

An exemplary embodiment of the present invention has been described. In the exemplary embodiment described above, in a case where a document stored in the storage unit 150 of an image processing apparatus 100 is a duplicate of another, the image processing apparatus 100 moves the duplicate to a device at the transfer destination to delete the duplicate from the storage unit 150 when the image processing apparatus 100 transitions to the inaccessible state. However, this is merely an example. When the image processing apparatus 100 transitions to the inaccessible state, the image processing apparatus 100 may create a duplicate of the duplicate and transfer the created duplicate to a device at the transfer destination, and may keep the "original duplicate" left in the image processing apparatus 100. Referring to the example illustrated in FIG. 11, both the original document (with document ID "100002") and the duplicate of the document with document ID "100001" may be left in the device B that is shut down. The device B, which has entered the inaccessible state, inquires of the device C about the history of reception and printing when the device B is activated again or at a periodic timing of polling after the device B has been activated. Then, the device B is notified that these two documents have been printed and is able to delete the two documents accordingly.

The information processing unit 130 of the image processing apparatus 100 described above by way of example is implemented by causing a computer to execute a program implementing the functions of the image processing apparatus 100. The computer has a circuit configuration of hardware in which, for example, a microprocessor such as a central processing unit (CPU), memories (primary storage) such as a random access memory (RAM) and a read-only memory (ROM), a controller that controls a fixed storage device such as a hard disk drive (HDD) or a solid-state drive (SSD), various input/output (I/O) interfaces, a network interface that performs control for connection with a network such as a local area network, and other suitable components are connected to one another via a bus, for example. In addition, devices may also be connected to the bus via, for example, the I/O interface. Examples of the devices include a disk drive for reading and/or writing data from and/or to a portable disk recording medium such as a compact disc (CD) or a digital versatile disc (DVD), and a memory reader/writer for reading and/or writing data from and/or to a portable non-volatile recording medium complying with any standard, such as a flash memory. A program describing the content of the processes of the function modules described above by way of example is saved in a fixed storage device such as an HDD through a recording medium such as a CD or a DVD or via a communication unit such as a network, and is installed in the computer. The program stored in the fixed storage device is read onto the RAM and is executed by the microprocessor such as a CPU to implement the function modules described above by way of example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a providing unit that provides document data accumulated in the image processing apparatus in response to a request from another image processing apparatus within an image processing apparatus group that is identical to the image processing apparatus group to which the image processing apparatus is included;
a transfer unit that transfers a duplicate of a document accumulated in the image processing apparatus to the another image processing apparatus in an in-operation state within the image processing apparatus group when the image processing apparatus transitions to an inaccessible state;
a reception history record recording unit that, upon receiving an another duplicate of an another document from the another image processing apparatus within the image processing apparatus group, accumulates the received another duplicate of the another document and records a reception history record indicating receipt of the another duplicate of the another document;
a printing history record recording unit that, in response to printing of the document in the image processing apparatus or the another duplicate of the another document obtained from the another image processing apparatus within the image processing apparatus group, records a printing history record indicating printing of the document or the another duplicate of the another document; and
a deletion unit that, upon obtaining a reception history record and the printing history record for the another duplicate document accumulated in the image processing apparatus from the another image processing apparatus within the image processing apparatus group after the image processing apparatus has transitioned from the inaccessible state to the in-operation state, deletes the duplicate of the document from the image processing apparatus.

2. The image processing apparatus according to claim 1, wherein upon obtaining the reception history record and the printing history record for the document accumulated in the image processing apparatus by periodically obtaining the reception history record and the printing history record from the another image processing apparatus within the image processing apparatus group after the image processing apparatus has transitioned from the inaccessible state to the in-operation state, the deletion unit deletes the document from the image processing apparatus.

3. A non-transitory computer readable medium storing a program causing a computer to execute a process for image processing, the process comprising:
providing a document data accumulated in an image processing apparatus in response to a request from another image processing apparatus within an image processing apparatus group that is identical to the image processing apparatus group to which the image processing apparatus is included;
transferring a duplicate of a document accumulated in the image processing apparatus to the another image processing apparatus in an in-operation state within the image processing apparatus group when the image processing apparatus transitions to an inaccessible state;
upon receiving an another duplicate of an another document from the another image processing apparatus within the image processing apparatus group, accumulating the received another duplicate of the another document and recording a reception history record indicating receipt of the another duplicate of the another document;
in response to printing of the document in the image processing apparatus or the another duplicate of the another document obtained from the another image processing apparatus within the image processing apparatus group, recording a printing history record indicating printing of the document or the another duplicate of the another document; and
upon obtaining a reception history record and the printing history record for the document accumulated in the image processing apparatus from the another image processing apparatus within the image processing apparatus group after the image processing apparatus has transitioned from the inaccessible state to the in-operation state, deleting the duplicate of the document from the image processing apparatus.

4. An image processing method to control an image processing apparatus group comprising:
providing document data accumulated in an image processing apparatus in response to a request from another image processing apparatus within the image processing apparatus group that is identical to the image processing apparatus group to which the image processing apparatus is included;
transferring a duplicate of a document accumulated in the image processing apparatus to the another image processing apparatus in an in-operation state within the apparatus image processing group when the image processing apparatus transitions to an inaccessible state;
upon receiving an another duplicate of an another document from the another image processing apparatus within the image processing apparatus group, accumulating the received another duplicate of the another document and recording a reception history record indicating receipt of the another duplicate of the another document;
in response to printing of the document in the image processing apparatus or the another duplicate of the another a document obtained from the another image processing apparatus within the image processing apparatus group, recording a printing history record indicating printing of the document or the another duplicate of the another document; and
upon obtaining a reception history record and the printing history record for the document accumulated in the image processing apparatus from the another image processing apparatus within the image processing apparatus group after the image processing apparatus has transitioned from the inaccessible state to the in-operation state, deleting the duplicate of the document from the image processing apparatus.

* * * * *